United States Patent
Saunders et al.

(10) Patent No.: US 7,765,600 B2
(45) Date of Patent: Jul. 27, 2010

(54) METHODS AND APPARATUSES FOR AUTHORIZING FEATURES OF A COMPUTER PROGRAM FOR USE WITH A PRODUCT

(75) Inventors: Jeri L. Saunders, Encinitas, CA (US);
Annie O. Chen, Del Mar, CA (US);
Erik J. Elstermann, Carlsbad, CA (US);
John I. Okimoto, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1820 days.

(21) Appl. No.: 10/838,413

(22) Filed: May 4, 2004

(65) Prior Publication Data
US 2005/0251488 A1 Nov. 10, 2005

(51) Int. Cl.
G06F 7/04 (2006.01)
G06F 12/14 (2006.01)
H04N 7/167 (2006.01)
G06F 21/00 (2006.01)

(52) U.S. Cl. .............. 726/27; 726/28; 726/29; 726/30; 726/31; 713/187; 713/189; 380/201; 380/203; 380/229; 380/230; 380/239; 705/51; 705/57; 705/59

(58) Field of Classification Search ............. 726/27–31; 713/189, 187; 705/51, 57, 59; 380/201, 380/203, 229, 230, 239
See application file for complete search history.

(56) References Cited

U.S. PATENT DOCUMENTS

| | | | | |
|---|---|---|---|---|
| 5,953,419 | A * | 9/1999 | Lohstroh et al. | 713/165 |
| 6,052,784 | A * | 4/2000 | Day | 726/22 |
| 6,188,995 | B1 * | 2/2001 | Garst et al. | 705/59 |
| 6,557,105 | B1 * | 4/2003 | Tardo et al. | 713/193 |
| 6,961,633 | B1 * | 11/2005 | Marbach et al. | 700/97 |
| 2002/0049693 | A1 * | 4/2002 | Gase | 707/1 |
| 2003/0037237 | A1 * | 2/2003 | Abgrall et al. | 713/166 |
| 2003/0084291 | A1 * | 5/2003 | Yamamoto et al. | 713/168 |
| 2004/0039924 | A1 * | 2/2004 | Baldwin et al. | 713/189 |
| 2004/0129787 | A1 * | 7/2004 | Saito et al. | 235/492 |
| 2004/0193913 | A1 * | 9/2004 | Han et al. | 713/200 |
| 2005/0064907 | A1 * | 3/2005 | Nealon | 455/560 |

\* cited by examiner

*Primary Examiner*—Aravind K Moorthy
(74) *Attorney, Agent, or Firm*—Stewart M. Wiener

(57) ABSTRACT

A method for authorizing a computer program having a number of features for use with a product includes: receiving license data generated using a first key, the license data specifying a unique identifier associated with the product and specifying at least one feature authorized for use with the product; using a second key associated with the first key, obtaining the unique identifier from the license data; retrieving a product identifier from the product; determining whether the unique identifier corresponds to the product identifier; and based on the determination, authorizing use of the at least one feature with the product.

20 Claims, 2 Drawing Sheets

METHODS AND APPARATUSES FOR AUTHORIZING FEATURES OF A COMPUTER PROGRAM FOR USE WITH A PRODUCT

BACKGROUND OF THE INVENTION

1. Field of the Invention

Aspects of this invention relate generally to software licensing, and more particularly to methods and apparatuses for authorizing certain features of a computer program for use with a product.

2. Description of Related Art

Computer programs operating with devices, such as communications network devices (for example, multi-device controllers, transcoders, event managers, and other equipment used in cable communication systems) and consumer appliances (for example, television sets, set-top boxes, and other processor-based consumer appliances), frequently include multiple features, such as basic and advanced/specialized features.

Computer program suppliers typically provide software licenses that specify the terms under which computer programs may be used, to limit revenue losses that may occur because of activities such as piracy and the re-use of computer programs on unlicensed devices. Nevertheless, computer programs are often used outside of the scope of software licenses. Moreover, because users of multi-featured computer programs typically have access to all of the features of the computer programs, computer program providers may not realize additional revenue when the computer programs are updated with new features and provided to licensed users.

Many software licensing management tools have been developed to increase compliance with software licenses, including but not limited to: copy protection schemes, which allow computer programs to be installed one time; node-locking techniques, which limit the use of computer programs to a single device; identification ("ID")-based licensing, which allows the use of computer programs only by those inputting a specific user ID; site licensing, which allows the use of computer programs within a defined geographical area or network; floating licensing, which allows the use of computer programs in proportion to an amount paid for such usage, and time-based licensing, which allows the use of computer programs between specific start and end dates.

Existing tools for software licensing management, however, are generally insecure and inflexible, and do not provide specifically for the licensing of individual features of a computer program in both single- and multi-user environments.

There are, therefore, needs for methods and apparatuses for authorizing individual features of a computer program for use with a particular product, which methods and apparatuses are secure, and are able to flexibly handle multiple products, with multiple features, in both single- and multi-user environments.

SUMMARY

In accordance with one aspect of the present invention, a method for authorizing a computer program for use with a product, the computer program having a plurality of features, includes: receiving license data (which may be encrypted) generated using a first key, the license data specifying a unique identifier, such as a logical or physical identifier (for example, a media access control address or a virtual identifier), associated with the product and the license data specifying at least one feature authorized for use with the product; using a second key associated with the first key, obtaining the unique identifier from the license data; retrieving a product identifier from the product; determining whether the unique identifier corresponds to the product identifier; and based on the determination, authorizing use of the at least one feature with the product. In a further step, the at least one feature may be activated for use with the product.

The first key may be a private key of a private key-public key pair, and the second key may be a public key of the private key-public key pair. The step of obtaining the unique identifier may include decrypting at least a portion of the license data using the second key, and the second key may be provided with, or part of, the computer program used to control the product. The license data may further specify a condition, such as a quantity, associated with the at least one feature, and the step of authorizing use of the at least one feature may involve restricting use of the at least one feature in a manner specified by the condition, such as by restricting use of the feature to the specified quantity.

In accordance with another aspect of the present invention, a computer-readable medium may be encoded with a computer program which, when loaded into a processor, implements the foregoing method.

In accordance with a further aspect of the present invention, an apparatus for authorizing a computer program for use with a product, the computer program having a plurality of features, includes an interface for receiving license data generated using a first key. The license data specifies a unique identifier associated with the product, and specifies at least one feature authorized for use with the product. The apparatus further includes a computer-readable storage medium, and a processor responsive to the interface, the computer-readable storage medium, and to a computer program. When the computer program, is loaded into the processor, it is operative to perform a method including: using a second key associated with the first key, obtaining the unique identifier from the received license data; retrieving a product identifier from the product; determining whether the unique identifier corresponds to the product identifier; and based on the determination, authorizing use of the at least one feature with the product.

The apparatus may be a broadcast network controller for use within a broadband communication system, and/or a portion of the product. The product may be a transcoder device or a message generation device for use within a broadband communication system.

In accordance with a still further aspect of the present invention, a method for authorizing a computer program for use with a product, the computer program having a plurality of features, includes: using a first key, generating license data, the license data specifying a unique identifier associated with the product, and specifying at least one feature authorized for use with the product; and arranging for a user of the product to receive the license data, the unique identifier obtainable from the license data using a second key associated with the first key, based on a determination of whether the unique identifier corresponds to a product identifier retrieved by the product, the at least one feature authorized for use with the product.

According to still another aspect of the present invention, a computer-readable medium is encoded with a computer program which, when loaded into a processor, implements the foregoing method.

In accordance with yet another aspect of the present invention, an apparatus for authorizing a computer program for use with a product, the computer program having a plurality of features, includes an interface for specifying a unique identifier associated with the product and for specifying at least one feature authorized for use with the product. The apparatus also includes a computer-readable storage medium, and a processor responsive to the interface, the computer-readable storage medium, and to a computer program. When the computer program is loaded into the processor it is operative to perform a method including: based on the specified unique identifier and the specified at least one feature, using a first key, generating license data, the license data specifying a unique identifier associated with the product and specifying at least one feature authorized for use with the product; and arranging for a user of the product to receive the license data, the unique identifier obtainable from the license data using a second key associated with the first key, based on a determination of whether the unique identifier corresponds to a product identifier retrieved by the product, the at least one feature is authorized for use with the product.

DETAILED DESCRIPTION

Figure 1:
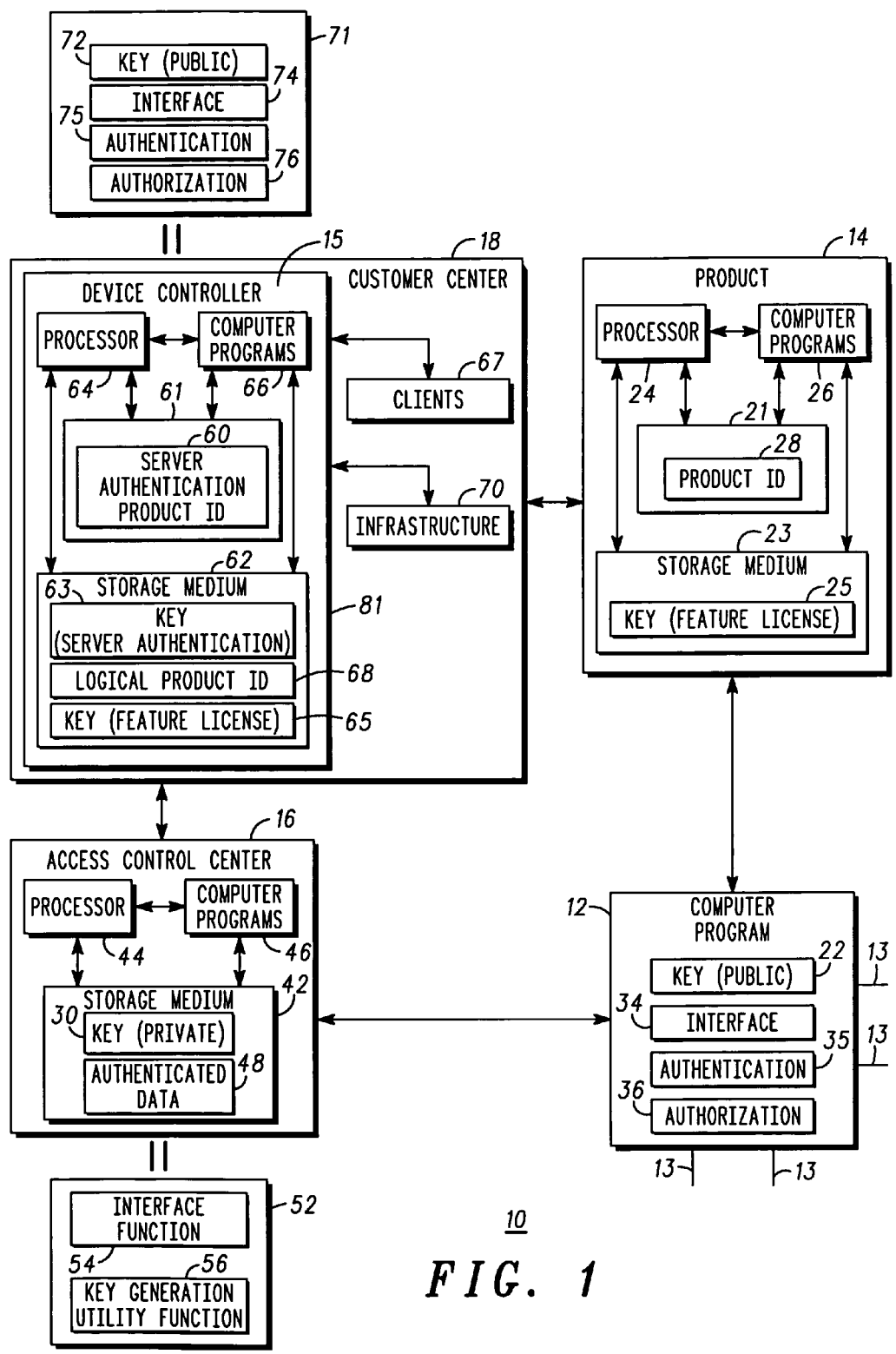
FIG. 1 is a diagram illustrating elements of a system for authorizing a computer program for use with a product, in accordance with various aspects of the present invention.

Turning now to the drawings, wherein like numerals designate like components, FIG. 1 illustrates a block diagram of a system 10 for authorizing use of a computer program 12, which has one or more features 13, with a product 14, in accordance with aspects of the present invention. Elements of system 10 include an access control center 16, and a customer center 18.

For exemplary purposes, access control center 16 includes one or more secure servers, such as Sun® microcomputers, and is unrelated to customer center 18. Customer center 18 is a multiple service operator, such as a broadband communications system operator (for example, a cable system operator), operating at one or more geographical locations, computer program 12 is any multi-feature set of instructions executable by product 14 when loaded into a processor, and product 14 is a single- or multi-user communications network device available from Motorola, Inc., such as a TMX-2010 Transport Multiplexer, a DigiCipher® Event Manager, or a software product, such as the Broadcast Network Controller, that controls communications network devices.

As shown, product 14 has a well-known internal arrangement, including items such as network media 21, computer-readable storage medium 23, a processor 24, and computer programs 26. Processor 24 is responsive to network media 21, computer-readable storage medium 23, and to computer programs 26. Product 14 may further include other elements (not shown), configured to provide specific functionality of product 14. Product 14 does not have to include hardware, however—product 14 may be a computer program, for example.

A unique logical or physical product identifier ("product ID") 28 is preferably associated with product 14 and/or commonly controlled products associated therewith. Product ID 28 may be stored in network media 21, computer-readable storage medium 23, or another storage medium (not shown), or may be included in, or accessed by, one or more computer programs 26. For example, a media access control ("MAC") address, which is an Ethernet hardware address included in any network media, such as the network interface card present in devices such as the TMX-2010 Transport Multiplexers, or in ordinary PCs, may serve as product ID 28.

Product 14 may also receive and store a feature license key 25 (discussed further below), which is an encrypted file containing authentication/authorization data 48 (also discussed further below). As shown, product 14 may store feature license key 25, in its encrypted form, on computer-readable storage medium 23, but feature license key 25 may also be stored elsewhere—for example, within customer center 18 or access control center 16, or on a computer-readable storage medium on the computing platform on which computer program 12 executes. Feature license key 25 may be assigned by a manufacturer (via smart-cards, for example), or created/transmitted by access control center 16 (for example, by key generation utility 46, discussed further below in connection with access control center 16).

Computer program 12 operates to perform basic functions of product 14, and one or more features 13 of computer program 12 operate to perform advanced/specialized functions of product 14. Each feature 13 of computer program 12 may be assigned a part number or other reference number or description, in accordance with well-known methods and techniques. For example: on the TMX-2010 Transport Multiplexer, which has a basic function of video transcoding/multiplexing, a particular feature 13 of computer program 12 operates to control closed-loop statistical multiplexing of network television streams and another feature controls access to digital splicing; on the DigiCipher® Event Manager, which has a basic function of transport stream message insertion, a particular feature 13 of computer program 12 operates to determine the type of messages (for example, proprietary analog cue messages, or messages that support digital splicing) that may be generated and inserted into a network multiplex for a particular customer; and on the Broadcast Network Controller, which functions to manage network devices and multiplexing, a particular feature 13 of computer program 12 operates to configure and/or control access to features of computer programs for multiple products, such as multiple TMX-2010 Transport Multiplexers.

Computer program 12 includes an authentication key 22, which is used to decrypt authentication/authorization data 48 (discussed below) present in feature license key 25 delivered to the customer. Authentication key 22 is preferably the public key part of a public key/private key pair (a corresponding private key 30 is held by access control center 16 and is also discussed further below), although authentication key 22 may also be based on symmetric key technology, asymmetric key technology, a blend thereof, or other existing or future key-based authentication/encryption technologies.

Computer program 12 is generally organized into functional components. Interface function 34, which may be, for example, a human-device interface such as a browser, or a modem or other network connection support device(s) or program(s), selected or implemented by one skilled in the art, is responsive to receive authentication/authorization data 48 (discussed further below) in the form of a feature license key 25 and certain information from a user of computer program 12.

Figure 4:
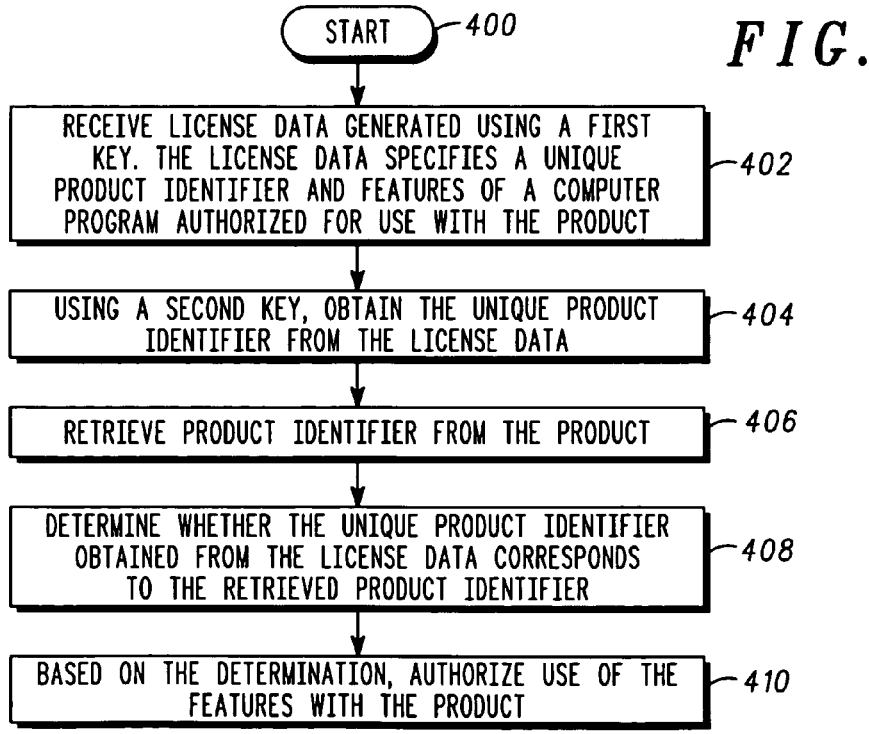
FIG. 4 is a flowchart of a method for authorizing a computer program for use with a product, in accordance with other aspects of the present invention.

Computer program 12 also includes functional algorithms 35 and 36 (discussed further below in connection with FIGS. 2 and 4) required to decode authentication/authorization data 48 present in feature license key 25, and to use the decoded information to authenticate Product ID 28 and to provide access to features 13 authorized by feature license key 25.

Access control center 16 has a well-known internal arrangement including items such as a computer-readable storage medium 42, a processor 44, and computer programs 46. Access control center 16 may further include other well-known elements (not shown), configured in well-known manners using well-known techniques, such as: physical memory; persistent data storage and/or additional storage devices; disk controllers; network adapters or interfaces; or human-device interfaces.

Computer-readable storage medium 42 stores, among other things: key 30 (discussed further below), which is preferably a private key of a private-key/public-key pair, but could also be a secret key for a symmetric key encryption/decryption algorithm (such as DES) corresponding to a particular type of product 14; and authentication/authorization data 48 (also discussed further below), which is/are used by a key generation utility function 56 (discussed further below) to generate feature license key 25 that is transmitted to the operator of customer center 18.

Processor 44 is responsive to computer-readable storage medium 42 and computer programs 46. Computer programs 46, which may be stored on computer-readable storage medium 42 or another storage medium (not shown), are generally organized into functional components. Block 52 illustrates certain aspects of the functional arrangements of computer programs 46 that pertain to the generation of feature license key 25, using private key 30 and authentication/authorization data 48, which are issued to the operator of the customer center 18 and will be processed by computer program 12 for use with product 14.

Interface function 54, which may be, for example, a human-device interface such as a browser, or a modem or other network connection support device(s) or program(s), selected or implemented by one skilled in the art, is responsive to receive certain information regarding computer program 12, features 13, customer center 18, and product 14, and to provide such information to key generation utility function 56.

Key generation utility function 56, which may be a computer program 46 created using a programming language based on Sun Microsystems' Java technology and stored in computer-readable memory 42 (but may be hardware, software, firmware, or any combination thereof), represents a computer program, which, when executed, is capable of encoding authentication/authorization data 48 and encrypting, using private key 30, the encoded result to create feature license key 25 for features 13 of computer program 12 for use with product 14 at customer center 18. Specifically, as discussed further below in connection with FIG. 2, key generation utility function 56 provides password-protected access to various functionality, including receipt, composition, encoding, encryption, storage, and retrieval of various components of authentication/authorization data 48.

Key generation utility function 56 also maintains authentication and authorization data such as the public 22 and private 30 key pair for each product, and maintains product and customer records in persistent data storage. A product record may include, for example: a product name; information regarding defined features 13 of a specific computer program 12 for use on a particular product/product type and product ID. Information regarding licensable features, such as feature names, feature IDs, feature part numbers, feature descriptions, and types of conditions/restrictions that may be imposed with respect to the use of individual features, may also be maintained. A customer record may include, for example: a company name; a customer contact; a customer address and/or email address; products 14 located at a particular customer site (by product name and product ID); and features 13 of specific computer programs 12 enabled for each product ID at a particular customer site. Product and customer records allow, among other things, access control center 16 to create feature license key(s) 25 (discussed further below) that overwrite existing authorization data, for the purposes of adding, modifying, or removing features of computer programs licensed for use with products.

Customer center 18 is shown for exemplary purposes as including infrastructure 70, a device controller 15, such as a Broadcast Network Controller available from Motorola, Inc., and clients 67 of device controller 15. Infrastructure 70, which represents well-known elements included in a local- or wide-area network, may be configured in well-known manners using well-known techniques.

Device controller 15 represents a type of product 14 that is used to configure and/or control multiple other products 14, such as multiple TMX-2010 Transport Multiplexers. Device controller 15 includes one or more servers (for exemplary purposes, one server is shown) having well-known internal arrangement(s), including items such as network media 61, a computer-readable storage medium 62, one or more processors 64, and computer programs 66 (analogous in structure and function to network media 21, computer-readable storage medium 23, processor 24, and computer programs 26). It will be understood that device controller 15 may further include other elements (not shown), configured to provide specific functionality of device controller 15, along with physical memory, persistent data storage and/or additional storage devices, disk controllers, network adapters or interfaces, or human-device interfaces. Device controller 15 may exist as part of a server-client relationship with clients 67.

Set of features 81 authorized for device controller 15 may be spread amongst all products 14 under its control. In this case, individual product ID(s) 28 for each product 14 may not be relevant. Instead, a logical product ID 68 and comprehensive feature set is associated with device controller 15 in a two-step process. First, logical product ID 68 is associated with each server on which device controller 15 executes, using a server authentication key 63 for each server. Each server authentication key uses a server authentication product ID 60 for each individual server to authenticate each server on which device controller 15 executes and to assign logical product ID 68 to each server. Server authentication product ID 60 may be each server's unique MAC address. Logical product ID 68 may be stored in computer-readable storage medium 62.

Processor 64 is responsive to network media 61, computer-readable storage medium 62 and computer programs 66. Computer programs 66, which may be stored on computer-readable storage medium 62 or another storage medium (not shown), are generally organized into functional components. Block 71 illustrates certain aspects of the functional arrangements of computer programs 66 that pertain to authentication and authorization of certain features 81 of device controller 15, to manage multiple products 14 under common configuration and/or control of device controller 15 at customer center 18. Functions 74, 75 and 76 shown in block 71 are analogous to functions 34, 35, and 36, respectively, performed by computer program 12, which provides authentication and feature authorization for a single product 14. Block 71 further includes an authentication (public) key 72 specific to the device controller/product type, which is analogous in structure and function to authentication (public) key 22 associated with computer program 12.

Interface function 74, which may be, for example, a human-device interface such as a browser, or a modem or other network connection support device(s) or program(s), selected or implemented by one skilled in the art, is responsive to receive authentication/authorization data 48 (discussed further below).

Figure 2:
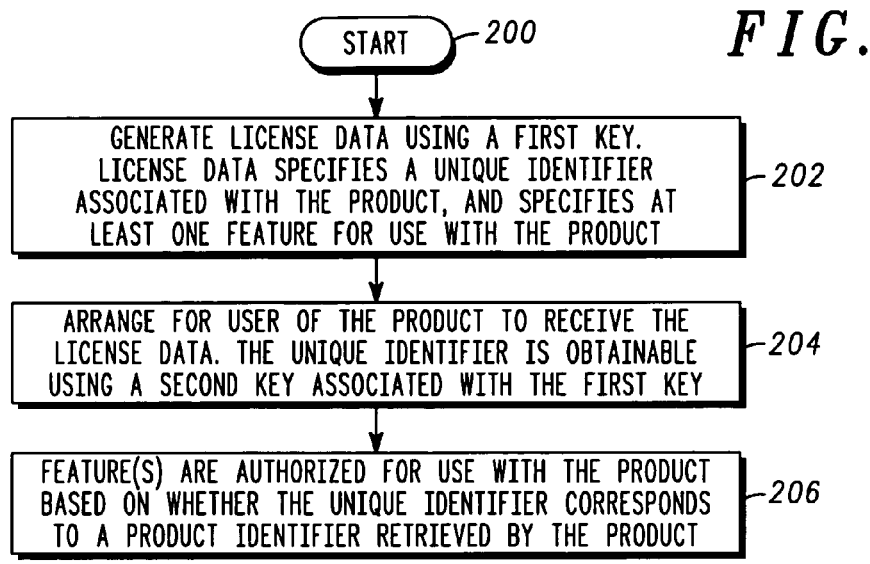
FIG. 2 is a flowchart of a method for authorizing a computer program for use with a product, in accordance with certain aspects of the present invention.

Authentication function 75 and authorization function 76, which may be parts of computer program 66 created using a programming language based on Sun Microsystems' Java technology and stored in computer-readable memory 62 (but may be hardware, software, firmware, or any combination thereof), represent computer program(s), which, when executed, is/are capable of authenticating and providing access to features 81 of device controller 15 executing on multiple servers for use with multiple products 14 under common configuration and/or control of device controller 15 at customer center 18. Specifically, as discussed further below in connection with FIGS. 2 and 4, functional algorithms 75 and 76 are used to decode logical product ID 68 present in server authentication key 63, and to use the decoded information to authenticate server authentication product ID 60 and logical product ID 68 (note that this process occurs multiple times, for each server on which device controller 15 executes). Functional algorithms 75 and 76 also use authentication (public) key 72 to decrypt/decode authentication/authorization data 48 in feature license key 65, and authenticate against the logical product ID 68. With continued reference to FIG. 1, FIG. 2 is a flowchart of a method, in accordance with certain aspects of the present invention, for authorizing a computer program, such as computer program 12, for use with a product, such as product 14 or device controller 15.

In operation, at access control center 16, key generation utility function 56 receives information via interface function 54, including identification of a customer (for example, customer center 18) that wishes to use one or more features 13 of computer program 12 with product 14 or one or more features 81 of device controller 15. Key generation utility function 56 uses the received information, along with product ID 28 (or product ID 60), to generate the contents of authentication/authorization data 48. Key generation utility function 56 encrypts authentication/authorization data 48 using key 30, which is preferably the private key of a public/private key pair (preferably a unique private key 30 may be established for each product type), but may be a secret key for a symmetric key algorithm, or another type of algorithm that produces a value that can be backwards calculated to determine the original value, such algorithms being well known and widely available, to create feature license key 25 (or server authentication key 63 and feature license key 65).

Figure 3:
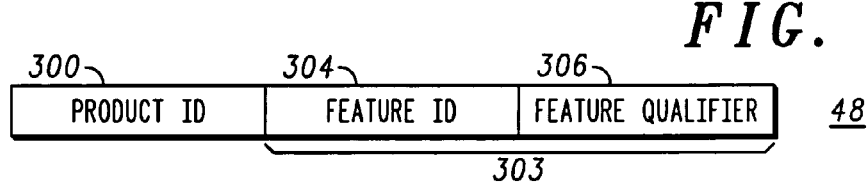
FIG. 3 illustrates information usable to create authorization data for use in connection with the system shown in FIG. 1, and the methods shown in FIGS. 2 and 4.

FIG. 3 illustrates, in block form, the information that may be used to create authentication/authorization data 48 for a single product ID (28, 60, or 68). Authentication/authorization data 48 is generated using input variables, including a product ID 300 (such as product IDs 28, 60, and/or 68), and a set of feature descriptors 303, which defines the features of a particular computer program, such as computer program 12, to be authorized for use with a specific product, such as product 14. A single feature is defined by a feature ID value 304, and an optional feature qualifier value 306. Table 1 provides examples of combinations of product IDs 300, feature ID values 304, and feature qualifier values 306 for computer programs associated with three products available from Motorola, Inc.—the TMX-2010 Transport Multiplexer ("TMx2010"), the DigiCipher® Event Manager ("DEM"), and the Broadcast Network Controller ("BNC").

TABLE 1

| Product ID | | Feature | | | Feature Qualifier | |
| --- | --- | --- | --- | --- | --- | --- |
| | | | | | Range | |
| Product | Description | ID | Name | Part # | Description | Min | Max |
| TMx2010 | MAC Address | 1 | Encoder StatMux | 498526-001 | No. SE encoders | 1 | 30 |
| | | 2 | Digital Splicing | 498529-001 | No. splice services | 1 | 45 |
| DEM | MAC Address | 1 | Analog Cue Msgs | 139482-001 | N/A | 0 | |
| | | 2 | SCTE 35 Messages | 139483-001 | N/A | 0 | |
| | | 3 | Remote Control | 139484-001 | N/A | | |
| BNC | MAC Address | 0 | BNC ID Number | 507460-001 | ID Number | 1 | 65,535 |
| | BNC ID Number | 1 | Service Mgt | 507461-001 | N/A | | |
| | | 2 | Encoder Stat Mux | 507463-001 | No. SE encoders | 1 | 255 |
| | | 3 | Digital Splicing | 507462-001 | No. splice services | 1 | 255 |

The method begins at block 200, and continues at block 202, where license data is generated using a first key. The license data specifies a unique identifier associated with the product. The license data specifies at least one feature authorized for use with the product.

In an exemplary embodiment, authentication and authorization data are used to create a feature license key that is generated using a first key. The authentication data specifies a unique identifier associated with the product. The authorization data specifies at least one feature authorized for use with the product, once authenticated. The authentication process ensures that the key is being used on the product for which it was intended. Feature authorization can only be performed after the product has been authenticated.

Product ID 300 may have a six-byte representation. Two bytes are generally sufficient to provide the set of feature descriptors 303—one byte for feature ID value 304, and a second byte for feature qualifier value 306, which may be a numeric value. If feature qualifier value 306 has an upper limit that cannot be represented by a single byte (for example, it is greater than 255), four bytes (for example, two, two-byte pairs) may be used to provide the set of feature descriptors 303, with one of the two-byte pairs providing feature ID value 304 and a first byte of feature qualifier value 306. The other two-byte pair may provide an offset of feature ID value 304, and the second byte of feature qualifier value 306. The offset of feature ID value 304 may be equal to the value of feature ID value 304, plus 128. Determination of the most significant byte when a feature ID offset is required is based on whether or not the most significant bit of feature ID value 304, or the feature ID offset, is set to '1'. For features with a feature qualifier value 306 greater than 255, the qualifier byte associated with the feature ID offset byte will be the most significant byte of the qualifier.

With particular reference to device controller 15, the first feature ID value 304 specified in authentication/authorization data 48 may be the association of a particular logical product ID 68 with the device controller's server authentication product ID 60. If the logical product ID 68 is greater than 255, a feature ID offset byte may be used. The most significant byte of the feature qualifier value 306 (logical product ID 68) may be paired with the feature ID offset byte, and the least significant byte may be paired with feature ID value 304.

The feature qualifier range in Table 1 defines the minimum and maximum values that can be used as feature qualifier values 306 (for example, if the TMx2010 product can support between one and 45 services for digital splicing, the feature qualifier range would be a minimum value of one, and a maximum value of 45.) In circumstances where feature access does not require further information, a feature qualifier value of zero may be used. Feature qualifier ranges may also specify permitted uses, and restrictions thereon (for example, geographical restrictions, device-type restrictions, copy restrictions, or other use restrictions), of certain features. Referring again to FIG. 2, with continued reference to FIGS. 1 and 3, the method continues at block 204, where it is arranged for a user of the product to receive the license data. The unique identifier (Product ID 28, 60, and/or 68) is obtainable from the key 25, 63 or 65 using a second key 22 or 72 (public) associated with the first key 30 (private).

The second key may be, for example, authentication key 22 or authentication key 72, which are public keys corresponding to private key 30 for a particular private-key/public-key pair, and may be used, in conjunction with a decryption algorithm, such as provided by authentication function 35 or authentication function 75, to decrypt at least a portion of authentication/authorization data 48, such as product ID 300, and to decode the unencrypted result to compare with the retrieved product ID 28 (or product IDs 60 or 68).

Along with authentication/authorization data 48 in the form of license keys 25 or 63 and 65, key generation function 56 may also provide for creation of a certification document (not shown), which may accompany authentication/authorization data 48, and which sets forth details of computer program 12 and features 13 thereof authorized for use with product(s) 14, for which authentication/authorization data 48 is applicable.

Next, at block 206, it can be seen that the feature(s) may be authorized for use with the product based on the successful authentication of the unique identifier (Product ID 28 or 60 and 68).

For example, with respect to product 14, authentication function 35 may arrange for the retrieval of product ID 28 directly from product 14, such as from network media device 21, for comparison of product ID 28 to the decrypted/decoded product ID 300 obtained from authentication/authorization data 48 provided in feature license key 25. With respect to device controller 15, for example, authentication function 75 may retrieve product ID 60 and then 68 and authenticate product IDs 60 and then 68 against decrypted/decoded product ID 300 obtained from the server authentication key 63 and the feature license key 65.

If retrieved product IDs 28 and/or 60/68 correspond to (for example, match) decrypted/decoded product IDs 300, authorization functions 36 and/or 76 may proceed to decrypt and/or decode the remainder of authentication/authorization data 48 (to the extent it has not already been decrypted/decoded, if any), to determine feature ID values 304 and feature qualifier values 306 of computer program 12 that are usable with product(s) 14 and/or device controller 15. Only those features 13 or 81 and instances of features of computer program 12 specified by feature ID values 304 and feature qualifier values 306 are authorized for use.

In additional operational detail, with respect to a single product 14, authentication function 35 uses authentication (public) key 22 to decrypt and decode the product ID 300 contained in feature license key 25, then extracts product ID 28 from product 14 and compares the two values. If the two values are identical, authentication is complete. If the two values do not match, authentication has failed. Authorization function 36 uses authentication (public) key 22 to decrypt and decode the set of feature descriptors 303 from feature license key 25 and to provide access to authorized features 13 of computer program 12 for use with product 14 at customer center 18.

With respect to device controller 15, each device controller server (for example, there may be two servers in a redundant configuration) must first have its server authentication product ID 60 authenticated and have logical product ID 68 assigned and stored in computer-readable memory 62 (if there is more than one server, each server is assigned the same logical product ID). Then the device controller must determine the feature set for which it is authorized, from feature license key 65. The product ID in feature license key 65 is logical product ID 68 assigned to the server(s) by server authentication key(s) 63. There will be n+1 sets of authentication and authorization data 48 (1 set containing features and qualifiers, n sets containing logical product ID 68 for each server) required for a given customer center 18 in which multiple products 14 are controlled by device controller 15, where n is the number of servers whose server authentication product ID 60 (which may be the MAC address of a network media device 61) require authentication.

Using the BNC in Table 1 as an example, for a pair of redundant servers (multiple representations of device controller 15), three sets of authentication and authorization data are required. For each of the two device controllers, a server authentication key 63 is delivered to customer center 18. Product ID 300 in the first server authentication key is the server authentication product ID 60 of the first device controller (this may be the MAC address of a network media device 61 within the device controller). Product ID 300 in the second server authentication key on the second device controller is server authentication product ID 60 of the second device controller. Feature ID 304 in both server authentication keys 63 may be 0, which is the feature ID used to assign a BNC ID Number to an installation (customer center 18)—refer to Table 1. The BNC ID Number in the case of the BNC is, essentially, a logical product ID. The feature qualifier value in both server authentication keys 63 is the BNC ID Number (logical product ID 68) assigned (by access control center 16) to this set of servers (redundant device controllers 15) at customer center 18. Each of the server authentication keys is decrypted and decoded by authentication function 75. If product ID 300 retrieved from the authentication and authorization data 48 contained in server authentication license key 63 matches server authentication product ID 60 retrieved from one of the device controllers 15, then the authentication is successful for that device controller 15 (server). If the two values do not match, then authentication has failed.

Upon successful authentication of all server authentication keys 63 for all servers for a given device controller 15, authentication function 75 assigns feature qualifier value 306 (BNC ID Number) contained in the authentication and authorization data 48 of server authentication key 63 to the device controller by storing the feature qualifier value 306 as logical product ID 68 in computer-readable memory 62 of device controller 15 at customer center 18. Server authentication key 63 is also stored, in encrypted format, in computer-readable memory 62 of device controller 15 at customer center 18.

The third, and final, key for this example BNC customer center 18 is feature license key 65, which is an encrypted version of authentication/authorization data 48 that will authorize a set of feature descriptors 303 for logical product ID 68. In feature license key 65, product ID 300 is logical product ID 68 that was provided as feature qualifier 306 in server authentication key(s) 63 already processed by authentication function 75. Feature descriptors 303 identify feature IDs 304 and feature qualifiers 306 of each feature 81 to be authorized for this redundant set of device controllers at customer center 18.

In the first step of a two-step authentication process, authentication function 75 uses authentication (public) key 72 to decrypt and decode the server authentication product ID (part of authentication/authorization data 48) contained in server authentication key 63, then extracts server authentication product ID 60, which may be the MAC address of network media 61 (similar to product ID 28 in product 14), from device controller 15 and compares the two values. If the two values are identical, authentication is complete. If the two values do not match, authentication has failed. If the server authentication product ID is valid, authentication function 75 extracts the logical product ID (part of authentication/authorization data 48) from server authentication key 63 and stores logical product ID 68 in computer-readable memory 62.

In the second step of the two-step authentication process, authentication function 75 uses authentication (public) key 72 to decrypt and decode the logical product ID (part of authentication/authorization data 48) contained in feature license key 65 (the third key in this example), then extracts logical product ID 68 from computer-readable memory 62 and compares the two values. If the two values are identical, authentication of the feature license key 65 is complete. If the two values do not match, authentication has failed.

Authorization function 76 uses authentication (public) key 72 to decrypt and decode the authorized feature set (part of authentication/authorization data 48) from feature license key 65, and provides access to authorized features 81 of device controller 15 for use with one or more products 14 at customer center 18.

With continued reference to FIGS. 1-3, FIG. 4 is a flowchart of a method, in accordance with other aspects of the present invention, for authorizing a computer program, such as computer program 12 or device controller 15, for use with a product, such as product 14. The computer program has a number of features, such as features 13 (or, in the case of the device controller 15, features 81).

The method begins at block 400, and continues at block 402, where license data that was generated using a first key is received. The license data specifies a unique identifier associated with the product, and also specifies at least one feature authorized for use with the product. In an exemplary embodiment, feature license key 25 or 65 (or server authentication key 63) containing authentication/authorization data 48 that was encrypted using a first key is received. The authentication/authorization data 48 specifies a unique identifier associated with the product, and also specifies at least one feature authorized for use with the product.

Authentication/authorization data 48 may be transmitted to customer center 18 via a distributable medium (for example, by regular mail, email or on a compact disk), or by any other suitable means. A certification document (not shown) may also accompany the encrypted/encoded authentication/authorization data 48, which sets forth details of computer program 12 and features 13 (or device controller 15 and features 81) thereof authorized for use with product(s) 14, for which the authentication/authorization data is applicable. The certification document may also assist in deciding where a particular product 14 belongs within customer center 18.

At block 404, the unique identifier associated with the product is obtained from the license data. The unique identifier is obtained from the license data using a second key associated with the first key. The second key may be, for example, authentication key 22 or authentication key 72, which are public keys corresponding to private key 30 of a particular private-key/public-key pair, and may be used, in conjunction with a decryption algorithm, such as authentication function 35 or authentication function 75, to decrypt and/or decode product ID 300. A user of product 14 or device controller 15 may cause authentication function 35 or 75 to decrypt product ID 300 by using interface function 34 or 74 to browse to applicable keys, for example.

A product identifier is retrieved from the product, at block 406. For example, with respect to product 14, authentication function 35 may arrange for the retrieval of product ID 28 directly from product 14, such as from network media device 21. With respect to device controller 15, authentication function 75 may retrieve product IDs 60 and/or 68.

At block 408, it is determined whether the unique identifier obtained from the license data corresponds to the product identifier retrieved in step 406. For example, authentication functions 35 and/or 75 may compare retrieved product IDs 28 and/or 60/68 to decrypted/decoded unique product ID value) 300 obtained from the authentication/authorization data.

At block 410, based on the determination at block 408, one or more features of the computer program is/are authorized for use with the product. If retrieved product IDs 28 and/or 60/68 correspond to (for example, match) decrypted/decoded product IDs 300, authorization functions 36 and/or 76 may proceed to decrypt and/or decode the remainder of the license data (to the extent it has not already been decrypted/decoded, if any), to determine feature ID values 304 and feature qualifier values 306 of computer program 12 that are usable with product(s) 14 and/or device controller 15. Only those features 13 of computer program 12 (or features 81 of device controller 15) specified by feature ID values 304 and feature qualifier values 306 are authorized for use, and such authorized features may become active and/or visible/accessible to the user. If retrieved product IDs 28 and/or 60/68 do not correspond to (for example, do not match) decrypted/decoded product IDs 300, then a user may be alerted that certain features 13 of computer program 12 (or features 81 of device controller 15) are not authorized for use.

Thus, a solution is provided for authorizing individual features of a computer program for use with a particular product or group of commonly configured and/or controlled products. The methods and apparatuses described herein are able to handle multiple products, with multiple features, in both single- and multi-user environments, and enable flexible, secure software licensing practices. For example, capabilities of a particular computer program may be partitioned into different feature sets (for example, basic and advanced/specialized feature sets), and customers may be charged separate license fees for individual feature sets.

Features of a particular computer program licensed for use with a product may be added, modified, or removed by creating new license data, which, when provided to a user, overwrites the existing license data for the product. All features of a particular computer program may be enabled for testing by, for example, providing sample key generation and authentication/authorization functions keyed to a specific computer, which would be able to retrieve product IDs from various products, generate license data, and allow access to various features.

Aspects of the present invention have been described as being implemented using computer-readable media encoded with computer programs which, when loaded into processors, perform certain methods. Such computer programs may be implemented according to well-known software engineering practices for component-based software development. It will be appreciated, however, that aspects of the present invention are not limited to any specific embodiments of computer programs or signal processing methods. It will also be appreciated that computer programs referred to herein may be any stored instructions, in one or more parts (stored, for example, on storage media referred to herein, or on other internal or external storage media such as read-only-memories or random-access memories), and may include firmware or hardware, and may be used or implemented by one or more elements to implement the functions described herein.

Moreover, although specific functional elements and arrangements thereof have been described herein, it is contemplated that the systems and methods herein may be implemented in a variety of ways. Functional elements may be packaged together or individually, or may be implemented by fewer, more or different devices, and may be either integrated within other products, or adapted to work with other products externally. For example, one or more processors packaged together or with other elements may implement functions set forth herein in a variety of ways. When one element is indicated as being responsive to another element, the elements may be directly or indirectly coupled. Connections depicted herein may be logical or physical in practice to achieve a coupling or communicative interface between elements. Connections may be implemented as inter-process communications among software processes. Other allocations/combinations of products, feature license keys, product IDs, and computer programs (including public keys and algorithms) are possible. For example, feature license keys, product IDs, and computer programs may exist on the same or different devices, platforms, locations, and/or software.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method for authorizing a computer program for use with a product, the computer program having a plurality of features, the method comprising:
   receiving license data generated using a first key, the license data specifying a unique identifier associated with the product and the license data specifying at least one feature authorized for use with the product, the unique identifier including a logical identifier and a physical identifier that includes a media access control address, the logical identifier being a virtual identifier that allows multiple physical devices to be authorized using the same license data;
   using a second key associated with the first key, obtaining the unique identifier from the license data;
   retrieving a product identifier from the product;
   determining whether the unique identifier corresponds to the product identifier; and
   based on the determination, authorizing use of the at least one feature with the product.

2. The method according to claim 1, wherein the first key comprises a private key of a private key-public key pair, and wherein the second key comprises a public key of the private key-public key pair.

3. The method according to claim 1, wherein the first key and the second key are equal, comprising a secret key associated with a symmetric key encryption/decryption algorithm.

4. The method according to claim 1, wherein the product comprises a computer program.

5. The method according to claim 1 wherein the license data is encrypted.

6. The method according to claim 5, wherein the step of obtaining the unique identifier comprises decrypting at least a portion of the license data using the second key.

7. The method according to claim 6, wherein the second key is associated with the computer program used to control the product.

8. The method according to claim 1, further comprising:
   activating the at least one feature for use with the product.

9. The method according to claim 1, wherein the license data further specifies a condition associated with the at least one feature.

10. The method according to claim 9, wherein the step of authorizing use of the at least one feature comprises restricting use of the at least one feature in a manner specified by the condition.

11. The method according to claim 10, wherein the condition comprises a quantity specifying the extent to which the at least one feature may be used.

12. A computer-readable medium encoded with a computer program which, when loaded into a processor, implements the method of claim 1.

13. An apparatus for authorizing a computer program for use with a product, the computer program having a plurality of features, the apparatus comprising:
   an interface for receiving license data generated using a first key, the license data specifying a unique identifier associated with the product and specifying at least one feature authorized for use with the product, the unique identifier including a logical identifier and a physical identifier that includes a media access control address, the logical identifier being a virtual identifier that allows multiple physical devices to be authorized using the same license data;
   a computer-readable storage medium; and
   a processor responsive to the interface, the computer-readable storage medium, and to a computer program, the computer program, when loaded into the processor, operative to perform a method comprising:
   using a second key associated with the first key, obtaining the unique identifier from the received license data;
   retrieving a product identifier from the product;
   determining whether the unique identifier corresponds to the product identifier; and
   based on the determination, authorizing use of the at least one feature with the product.

14. The method according to claim 13, wherein the apparatus comprises a broadcast network controller for use within a broadband communication system.

15. The method according to claim 13, wherein the apparatus comprises at least a portion of the product.

16. The method according to claim 15, wherein the product comprises a transcoder device for use within a broadband communication system.

17. The method according to claim 15, wherein the product comprises a message generation device for use within a broadband communication system.

18. A method for authorizing a computer program for use with a product, the computer program having a plurality of features, the method comprising:
- using a first key, generating license data, the license data specifying a unique identifier associated with the product, and specifying at least one feature authorized for use with the product, the unique identifier including a logical identifier and a physical identifier that includes a media access control address, the logical identifier being a virtual identifier that allows multiple physical devices to be authorized using the same license data; and
- arranging for a user of the product to receive the license data, the unique identifier obtainable from the license data using a second key associated with the first key, based on a determination of whether the unique identifier corresponds to a product identifier retrieved by the product, the at least one feature authorized for use with the product.

19. A computer-readable medium encoded with a computer program which, when loaded into a processor, implements the method of claim 18.

20. An apparatus for authorizing a computer program for use with a product, the computer program having a plurality of features, the apparatus comprising:
- an interface for specifying a unique identifier associated with the product and for specifying at least one feature authorized for use with the product, the unique identifier including a logical identifier and a physical identifier that includes a media access control address, the logical identifier being a virtual identifier that allows multiple physical devices to be authorized using the same license data;
- a computer-readable storage medium; and
- a processor responsive to the interface, the computer-readable storage medium, and to a computer program, the computer program, when loaded into the processor, operative to perform a method comprising:
  - based on the specified unique identifier and the specified at least one feature, using a first key, generating license data, the license data specifying a unique identifier associated with the product and specifying at least one feature authorized for use with the product; and
  - arranging for a user of the product to receive the license data, the unique identifier obtainable from the license data using a second key associated with the first key, based on a determination of whether the unique identifier corresponds to a product identifier retrieved by the product, the at least one feature authorized for use with the product.

* * * * *